(12) United States Patent
Dufaure et al.

(10) Patent No.: US 12,158,239 B2
(45) Date of Patent: Dec. 3, 2024

(54) MULTILAYER STRUCTURE FOR TRANSPORTING OR STORING HYDROGEN

(71) Applicant: ARKEMA FRANCE, Colombes (FR)

(72) Inventors: Nicolas Dufaure, Serquigny (FR); Patrick Dang, Serquigny (FR); Antoine Goupil, Seoul (KR)

(73) Assignee: ARKEMA FRANCE, Colombes (FR)

( * ) Notice: Subject to any disclaimer, the term of this patent is extended or adjusted under 35 U.S.C. 154(b) by 308 days.

(21) Appl. No.: 17/792,540

(22) PCT Filed: Jan. 26, 2021

(86) PCT No.: PCT/FR2021/050139
§ 371 (c)(1),
(2) Date: Jul. 13, 2022

(87) PCT Pub. No.: WO2021/152253
PCT Pub. Date: Aug. 5, 2021

(65) Prior Publication Data
US 2023/0075842 A1    Mar. 9, 2023

(30) Foreign Application Priority Data
Jan. 28, 2020 (FR) ........................... 2000816

(51) Int. Cl.
*F17C 1/06* (2006.01)
*B32B 27/08* (2006.01)
(Continued)

(52) U.S. Cl.
CPC ............... *F17C 1/06* (2013.01); *B32B 27/08* (2013.01); *B32B 27/12* (2013.01); *B32B 27/22* (2013.01);
(Continued)

(58) Field of Classification Search
CPC ........ B32B 2260/021; B32B 2260/023; B32B 2260/046; B32B 2262/101;
(Continued)

(56) References Cited

U.S. PATENT DOCUMENTS

| 5,499,739 A | 3/1996 | Greist et al. |
| 5,599,854 A | 2/1997 | Troy et al. |

(Continued)

FOREIGN PATENT DOCUMENTS

| CN | 101855488 A | 10/2010 |
| CN | 105984191 A | 10/2016 |

(Continued)

OTHER PUBLICATIONS

European Search Report and Search Opinion received for European Application No. 21708054, mailed on Aug. 30, 2022, 10 pages.
(Continued)

*Primary Examiner* — Yan Lan
(74) *Attorney, Agent, or Firm* — Boone IP Law (57) ABSTRACT

Multilayer structure for transporting hydrogen, including, from the inside, at least one sealing layer and at least one composite reinforcing layer, an innermost composite reinforcing layer being wound around an outermost adjacent sealing layer, the sealing layers of a composition predominantly of at least one semi-crystalline, long-chain polyamide thermoplastic polymer P1i (i=1 to n, n being the number of sealing layers), the Tf of which, as measured according to ISO 11357-3: 2013, is greater than 160° C., with the exception of one polyether block amide (PEBA), up to 50% by weight of impact modifier relative to the total weight of the composition and up to 1.5% by weight of plasticiser relative to the total weight of the composition, the composition being free of nucleating agent, and at least one of the composite reinforcing layers being of a fibrous material.

12 Claims, 2 Drawing Sheets

(51) Int. Cl.
  *B32B 27/12* (2006.01)
  *B32B 27/22* (2006.01)
  *B32B 27/34* (2006.01)
  *B32B 5/02* (2006.01)
  *B32B 5/26* (2006.01)

(52) U.S. Cl.
  CPC .............. *B32B 27/34* (2013.01); *B32B 5/024* (2013.01); *B32B 5/263* (2021.05); *B32B 2260/023* (2013.01); *B32B 2260/046* (2013.01); *B32B 2262/101* (2013.01); *B32B 2262/106* (2013.01); *B32B 2262/148* (2021.05); *B32B 2307/7242* (2013.01); *B32B 2439/40* (2013.01); *F17C 2203/0604* (2013.01); *F17C 2203/0619* (2013.01); *F17C 2203/0673* (2013.01); *F17C 2203/0675* (2013.01); *F17C 2209/2118* (2013.01); *F17C 2209/2127* (2013.01); *F17C 2209/2154* (2013.01); *F17C 2221/012* (2013.01); *F17C 2270/0168* (2013.01); *F17C 2270/0171* (2013.01); *F17C 2270/0184* (2013.01)

(58) Field of Classification Search
  CPC .......... B32B 2262/106; B32B 2262/14; B32B 2262/148; B32B 2307/7242; B32B 2439/40; B32B 27/08; B32B 27/12; B32B 27/22; B32B 27/34; B32B 27/38; B32B 5/024; B32B 5/263; B29C 53/582; B29C 53/602; B29C 63/0021; B29C 63/10; B29C 63/24; F17C 1/06; F17C 2203/0604; F17C 2203/0609; F17C 2203/0619; F17C 2203/0663; F17C 2203/0673; F17C 2203/0675; F17C 2209/2118; F17C 2209/2127; F17C 2209/2154; F17C 2221/012; F17C 2270/0168; F17C 2270/0171; F17C 2270/0184; B29L 2031/7156
  See application file for complete search history.

(56) References Cited

U.S. PATENT DOCUMENTS

| | | |
|---|---|---|
| 8,313,595 B2 | 11/2012 | Blanc et al. |
| 2008/0241562 A1 | 10/2008 | Bushelman et al. |
| 2009/0149600 A1 | 6/2009 | Ness |
| 2009/0203845 A1 | 8/2009 | Fukui et al. |
| 2011/0056960 A1 | 3/2011 | Blanc et al. |
| 2014/0008373 A1 | 1/2014 | Sharp et al. |
| 2016/0271919 A1 | 9/2016 | Berger |
| 2017/0029620 A1 | 2/2017 | Sato et al. |
| 2017/0210898 A1 | 7/2017 | Sour et al. |
| 2017/0335999 A1 | 11/2017 | Ochiai et al. |
| 2017/0343158 A1 | 11/2017 | Kato et al. |
| 2018/0119881 A1 | 5/2018 | Nony et al. |
| 2019/0085164 A1 | 3/2019 | Sabard et al. |
| 2019/0375182 A1 | 12/2019 | Kanesugi et al. |

FOREIGN PATENT DOCUMENTS

| | | |
|---|---|---|
| CN | 106255726 A | 12/2016 |
| CN | 107075251 A | 8/2017 |
| CN | 107428139 A | 12/2017 |
| CN | 107949596 A | 4/2018 |
| EP | 0342066 A1 | 11/1989 |
| EP | 0722961 A1 | 7/1996 |
| EP | 1505099 A2 | 2/2005 |
| EP | 3112421 A1 | 1/2017 |
| EP | 3172273 A1 | 5/2017 |
| EP | 3222668 A1 | 9/2017 |
| FR | 2923575 A1 | 5/2009 |
| WO | 9522030 A1 | 8/1995 |
| WO | 2014114766 A1 | 7/2014 |
| WO | 2016166326 A1 | 10/2016 |
| WO | 2017/102385 A1 | 6/2017 |
| WO | 2017/174949 A1 | 10/2017 |
| WO | 2018155491 A1 | 8/2018 |
| WO | 2021019181 A1 | 2/2021 |

OTHER PUBLICATIONS

International Preliminary Report on Patentability received for PCT Patent Application No. PCT/FR2021/050138, mailed on Aug. 11, 2022, 17 pages (9 pages of English Translation and 8 pages of Original Document).
International Preliminary Report on Patentability received for PCT Patent Application No. PCT/FR2021/050140, mailed on Aug. 11, 2022, 17 pages (9 pages of English Translation and 8 pages of Original Document).
International Preliminary Report on Patentability received for PCT Patent Application No. PCT/FR21/050139, mailed on Aug. 11, 2022, 20 pages.
International Search Report (PCT/ISA/210) with English translation and Written Opinion (PCT/ISA/237) mailed on May 17, 2021, by the European Patent Office as the International Searching Authority for International Application No. PCT/FR2021/050139. (17 pages).
International Search Report (PCT/ISA/210) with English translation and Written Opinion (PCT/ISA/237) mailed on May 17, 2021, by the European Patent Office as the International Searching Authority for International Application No. PCT/FR2021/050140. (13 pages).
International Search Report (PCT/ISA/210) with translation and Written Opinion (PCT/ISA/237) mailed on May 14, 2021, by the European Patent Office as the International Searching Authority for International Application No. PCT/FR2021/050138. (13 pages).

Figure 1

Permeability to H2 at 23°C

MULTILAYER STRUCTURE FOR TRANSPORTING OR STORING HYDROGEN

TECHNICAL FIELD

The present patent application relates to multilayer composite structures for transporting, distributing, or storing hydrogen, in particular for distributing or storing hydrogen, and the method for producing same.

PRIOR ART

Hydrogen tanks are currently attracting a lot of attention from numerous manufacturers, especially in the automotive sector. One of the goals sought is to propose increasingly fewer polluting vehicles. Thus, electric or hybrid vehicles comprising a battery aim to progressively replace combustion engine vehicles such as either gas or diesel vehicles. It has turned out that the battery is a relatively complex vehicle component. Depending on the positioning of the battery in the vehicle, it may be necessary to protect it from impact and from the outside environment, which can have extreme temperatures and variable humidity. It is also necessary to avoid any risk of flames.

Additionally, it is important that the operating temperature thereof not exceed 55° C. in order to not break down the cells of the battery and to preserve the life thereof. Conversely, for example in winter, it may be necessary to increase the battery temperature so as to optimize operation thereof.

Moreover, electric vehicles still suffer today from several problems, namely battery range, the use in these batteries of rare earth metals, the resources for which are not infinite, much longer recharging times than the length of time taken to fill a tank, as well as a problem of electricity production in various countries in order to be able to recharge the batteries.

Hydrogen is therefore an alternative to the electric battery, since hydrogen can be converted into electricity by means of a fuel cell and thus power electric vehicles.

Hydrogen tanks usually consist of a metallic liner (or sealing layer) that must prevent hydrogen from permeating out. One of the types of tank envisaged, referred to as Type IV, is based on a thermoplastic liner around which a composite is wound.

Their basic principle is to separate the two essential functions of sealing and mechanical strength and manage them independently of each other. In this type of tank, the liner (or sealing sheath) made of thermoplastic resin is combined with a reinforcement structure consisting of fibers (glass, aramid, carbon), also known as a reinforcement sheath or layer, which makes it possible to operate at much higher pressures while reducing weight and avoiding risks of explosive rupture in the event of severe external attacks.

The liners must have certain fundamental characteristics:
The possibility to be transformed by extrusion blow molding, rotational molding, injection molding or extrusion
Low permeability to hydrogen, indeed, the permeability of the liner is a key factor in limiting hydrogen losses from the tank;
Good mechanical properties (fatigue) at low temperatures (−40 to −70° C.); Thermal resistance at 120° C.

Indeed, it is necessary to increase the filling speed of the hydrogen tank, which should be roughly equivalent to that of a fuel tank for an internal combustion engine (about 3 to 5 minutes), but this increase in speed causes more significant heating of the tank, which then reaches a temperature of about 100° C.

The assessment of the performance and safety of hydrogen tanks can be determined in a reference European laboratory (GasTeF: hydrogen tank testing facility), as described in Galassi et al. (World hydrogen energy conference 2012, Onboard compressed hydrogen storage: fast filing experiments and simulations, Energy Procedia 29, (2012) 192-200).

The first generation of type IV tanks used a liner based on high-density polyethylene (HDPE).

However, HDPE has the disadvantage of having too low a melting point and high permeability to hydrogen, which represents a problem with new requirements in terms of thermal resistance and does not make it possible to increase the filling speed of the tank.

Liners based on polyamide PA6 have been in development for a number of years.

Nonetheless, PA6 has the disadvantage of having a low resistance to cold.

Application EP3112421 describes a polyamide resin composition for a molded article intended for high-pressure hydrogen, the composition comprising:
a polyamide 6 resin (A); and a polyamide resin (B) having a melting point, such as that determined by DSC, which is not greater than the melting point of the polyamide 6 resin (A)+20° C. and a cooling crystallization temperature, such as that determined by DSC, which is higher than the cooling crystallization temperature of the polyamide 6 resin (A).

French application FR2923575 describes a tank for storing fluid under high pressure comprising, at each end thereof along the axis thereof, a metallic end piece, a liner surrounding said end pieces, and a structural layer made of fiber impregnated with thermoset resin surrounding said liner.

Application EP3222668 describes a polyamide resin composition for a molded article intended for high-pressure hydrogen, the composition comprising a polyamide resin (A) comprising a unit derived from hexamethylenediamine and a unit derived from an aliphatic dicarboxylic acid of 8 to 12 carbon atoms and an ethylene/α-olefin copolymer (B) modified with an unsaturated carboxylic acid and/or one of its derivatives.

Application US2014/008373 describes a light storage cylinder for a high-pressure compressed gas, the cylinder having a liner surrounded by a constraining layer, the line comprising:
a first inner layer of impact-modified polyamide (PA) in contact with the gas, a thermoplastic outer layer in contact with the constraining layer; and
an adhesive binding layer between the first impact-modified PA inner layer and the outer thermoplastic layer.

WO18155491 describes a hydrogen transport component having a three-layer structure, the inner layer of which is a composition consisting of PA11, from 15 to 50% of an impact modifier and from 1 to 3% of plasticizer, or devoid of plasticizer, which has hydrogen barrier properties, good flexibility and durability at low temperature. However, this structure is suitable for pipes for transporting hydrogen but not for the storage of hydrogen.

Thus, there is still a need to optimize, on the one hand, the matrix of the composite so as to optimize its mechanical strength at high temperature and, on the other hand, the material composing the sealing sheath, so as to optimize its operating temperature. Thus, the optional modification of the composition of the material composing the sealing liner which will be carried out must not result in a significant increase in the manufacturing temperature (extrusion blow molding, injection molding, rotational molding, etc.) of this liner compared to what is practiced today.

These problems are solved by providing a multilayer structure of the present invention intended for transporting, distributing or storing hydrogen Throughout this description, the terms "liner" and "sealing sheath" have the same meaning.

The present invention thus relates to a multilayer structure intended for transporting, distributing, or storing hydrogen, comprising, from the inside to the outside, at least one sealing layer (1) and at least one composite reinforcement layer (2), said innermost composite reinforcement layer being would around said outermost adjacent sealing layer (1), said sealing layer(s) consisting of a composition predominantly comprising:

at least one semi-crystalline thermoplastic polymer P1i i=1 to n, n being the number of sealing layers, the Tm of which, as measured according to ISO 11357-3: 2013, is greater than 160° C., in particular greater than 170° C., with the exception of a polyether block amide (PEBA), up to 50% by weight of impact modifier, especially up to less than 15% by weight of impact modifier, in particular up to 12% by weight of impact modifier relative to the total weight of the composition, up to 1.5% by weight of plasticizer relative to the total weight of the composition, said composition being devoid of nucleating agent, said at least one polyamide thermoplastic polymer of each sealing layer that may be the same or different, and at least one of said composite reinforcement layers consisting of a fibrous material in the form of continuous fibers, which is impregnated with a composition predominantly comprising at least one polymer P2j, j=1 to m, m being the number of reinforcement layers, in particular an epoxy resin or epoxy-based resin, said structure being devoid of an outermost layer and adjacent to the outermost layer of polyamide polymer composite reinforcement.

The Inventors therefore found, unexpectedly, that the use of a long-chain semi-crystalline polyamide thermoplastic polymer comprising a limited proportion of impact modifier and of plasticizer, for the sealing layer, with a different polymer for the matrix of the composite, and especially an epoxy resin or epoxy-based resin, said composite being wound around the sealing layer, making it possible to obtain a structure suitable for transporting, distributing or storing hydrogen and especially an increase in the maximum temperature of use that can extend up to 120° C., thus making it possible to increase the filling speed of the tanks.

By "multilayer structure" a tank comprising or consisting of several layers should be understood, namely several sealing layers and several reinforcement layers, or one sealing layer and several reinforcement layers, or several sealing layers and a reinforcement layer or a sealing layer and a reinforcement layer.

The multilayer structure is therefore understood to exclude a pipe or a tube.

Polyether block amides (PEBAs) are copolymers with amide units (Ba1) and polyether units (Ba2), said amide unit (Ba1) corresponding to an aliphatic repeating unit chosen from a unit obtained from at least one amino acid or a unit obtained from at least one lactam, or a unit X.Y obtained from the polycondensation:

of at least one diamine, said diamine preferentially being chosen from a linear or branched aliphatic diamine or a mixture thereof, and of at least one carboxylic diacid, said diacid preferentially being chosen from: a linear or branched aliphatic diacid, or a mixture thereof, said diamine and said diacid comprising 4 to 36 carbon atoms, advantageously 6 to 18 carbon atoms;

said polyether units (Ba2) being especially derived from at least one polyalkylene ether polyol, especially a polyalkylene ether diol.

Nucleating agents are known to those skilled in the art and the term refers to a substance which, when incorporated into a polymer, forms nuclei for the growth of crystals in the molten polymer.

They may be selected for example from microtalc, carbon black, silica, titanium dioxide and nanoclays.

In one embodiment, the PA6 and the PA610 are excluded from said composition.

The expression "said structure being devoid of an outermost layer and adjacent to the outermost layer of polyamide polymer composite reinforcement" means that the structure is devoid of a layer of polyamide polymer situated above the outermost composite reinforcement layer.

In one embodiment, said multilayer structure consists of two layers, a sealing layer and a reinforcement layer.

The sealing layer or layers are the innermost layers compared to the composite reinforcing layers, which are the outermost layers.

The tank may be a tank for the mobile storage of hydrogen, that is on a truck for transporting hydrogen, on a car for transporting hydrogen and for supplying a fuel cell with hydrogen, for example, on a train for supplying hydrogen or on a drone for supplying hydrogen, but it can also be a tank for the stationary storage of hydrogen in a station for distributing hydrogen to vehicles.

Advantageously, the sealing layer (1) is leaktight to hydrogen at 23° C., i.e., the permeability to hydrogen at 23° C. is less than 500 cc·mm/m 2.24 h·atm at 23° C. under 0% relative humidity (RH).

In one embodiment, said sealing layer or layers consist of a composition predominantly comprising:

at least one semi-crystalline thermoplastic polymer P1i i=1 to n, n being the number of sealing layers, the Tm of which, as measured according to ISO 11357-3: 2013, is greater than 160° C., in particular greater than 170° C., excluding a polyether block amide (PEBA), and excluding PA11.

The composite reinforcement layer(s) is (are) wound around the sealing layer by means of ribbons (or tapes or rovings) of fibers impregnated with polymer, which are deposited for example by filament winding.

When several layers are present, the polymers are different.

When the polymers of the reinforcement layers are identical, several layers may be present, but advantageously a single reinforcement layer is present which then has at least one full winding around the sealing layer.

This entirely automatic process which is well known to those skilled in the art makes it possible, layer by layer, to select the winding angles which will afford the final structure its ability to withstand internal pressure loading.

When several sealing layers are present, only the innermost of the sealing layers is in direct contact with the hydrogen.

When only one sealing layer and a composite reinforcement layer are present, thus leading to a two-layer multilayer structure, then these two layers can adhere to one another, in direct contact with one another, especially because of the winding of the composite reinforcement layer over the sealing layer.

When several sealing layers and/or several composite reinforcing layers are present, then the outermost layer of said sealing layers, and thus the one opposite the layer in contact with the hydrogen, may or may not adhere to the innermost layer of said composite reinforcement.

The other composite reinforcement layers also may or may not adhere to one another.

The other sealing layers also may or may not adhere to one another.

Advantageously, only one sealing layer and one reinforcement layer are present, and do not adhere to one another.

Advantageously, only one sealing layer and one reinforcement layer are present, and do not adhere to one another, and the reinforcement layer consists of a fibrous material in the form of continuous fibers, which is impregnated with a composition predominantly comprising at least one polymer P2j, in particular an epoxy resin or an epoxy-based resin.

In one embodiment, only one sealing layer and one reinforcement layer are present, and do not adhere to one another, and the reinforcement layer consists of a fibrous material in the form of continuous fibers, which is impregnated with a composition predominantly comprising a polymer P2j which is an epoxy resin or an epoxy-based resin.

The expression "epoxy-based" throughout the description means that the epoxy represents at least 50% by weight of the matrix.

Regarding the sealing layer(s) and the thermoplastic polymer P1i

One or more sealing layers may be present.

Each of said layers consists of a composition predominantly comprising a at least one thermoplastic polymer P1i, i corresponding to the number of layers present. i is from 1 to 10, in particular from 1 to 5, especially from 1 to 3, preferentially i=1.

The term "predominantly" means that said at least one polymer is present in excess of 50% by weight relative to the total weight of the composition.

Advantageously, said at least one predominant polymer is present at more than 60% by weight, in particular at more than 70% by weight, particularly at more than 80% by weight, more particularly greater than or equal to 90% by weight, relative to the total weight of the composition.

Said composition may also comprise up to 50% by weight relative to the total weight of the composition of impact modifiers and/or a plasticizer and/or additives.

The additives may be selected from another polymer, an antioxidant, a heat stabilizer, a UV absorber, a light stabilizer, a lubricant, an inorganic filler, a flame retardant, a dye, carbon black and carbonaceous nanofillers, with the exception of a nucleating agent; in particular, the additives are selected from an antioxidant, a heat stabilizer, a UV absorber, a light stabilizer, a lubricant, an inorganic filler, a flame retardant, a dye, carbon black and carbonaceous nanofillers, with the exception of a nucleating agent.

Said other polymer may be another semi-crystalline thermoplastic polymer or a different polymer and especially an EVOH (Ethylene vinyl alcohol).

Advantageously, said composition predominantly comprises said thermoplastic polymer P1i, from 0 to 50% by weight of impact modifier, especially from 0 to less than 15% of impact modifier, in particular from 0 to 12% of impact modifier, from 0 to 1.5% of plasticizer and from 0 to 5% by weight of additives, the sum of the constituents of the composition being equal to 100%.

Advantageously, said composition predominantly consists of said thermoplastic polymer P1i, from 0 to 50% by weight of impact modifier, especially from 0 to less than 15% of impact modifier, in particular from 0 to 12% of impact modifier, from 0 to 1.5% of plasticizer and from 0 to 5% by weight of additives, the sum of the constituents of the composition being equal to 100%.

Said at least one predominant polymer in each layer may be the same or different.

In one embodiment, a single predominant polymer is present in at least the sealing layer that does not adhere to the composite reinforcing layer.

In one embodiment, said composition comprises an impact modifier of 0.1 to 50% by weight, especially from 0.1 to less than 15% by weight, in particular from 0.1 to 12% by weight of impact modifier relative to the total weight of the composition.

In one embodiment, said composition is devoid of plasticizer.

In another embodiment, said composition comprises an impact modifier of 0.1 to 50% by weight, especially of 0.1 to less than 15% by weight, in particular of 0.1 to 12% by weight of impact modifier, and said composition is devoid of plasticizer relative to the total weight of the composition.

In yet another embodiment, said composition comprises an impact modifier of 0.1 to 50% by weight, especially of 0.1 to less than 15% by weight, in particular of 0.1 to 12% by weight of impact modifier and from 0.1 to 1.5% by weight of plasticizer relative to the total weight of the composition.

In another embodiment, said composition is devoid of impact modifier.

Advantageously, said composition comprises from 0.1 to 1.5% by weight of plasticizer relative to the total weight of the composition and said composition is devoid of impact modifier.

In another embodiment, said composition is devoid of impact modifier and of plasticizer.

In this last embodiment, said composition predominantly comprises said thermoplastic polymer P1i and from 0 to 5% by weight of additives, in particular from 0.1 to 5% of additives, the sum of the constituents of the composition being equal to 100%.

In this case, said predominant thermoplastic polymer P1i is mixed with another polyamide.

Advantageously, said composition predominantly consists of said thermoplastic polymer P1i and from 0 to 5% by weight of additives, in particular from 0.1 to 5% of additives, the sum of the constituents of the composition being equal to 100%.

Advantageously, said composition predominantly consists of said thermoplastic polymer P1i, from 0 to 5% by weight of additives, in particular from 0.1 to 5% of additives, the sum of the constituents of the composition being equal to 100%.

In this case, said predominant thermoplastic polymer P1i is mixed with another polyamide.

Advantageously, said composition consists of said thermoplastic polymer P1i and from 0 to 5% of additives, in particular from 0.1 to 5% of additives, the sum of the constituents of the composition being equal to 100%.

Thermoplastic Polymer P1i

Thermoplastic, or semi-crystalline thermoplastic polymer, refers to a material that is generally solid at ambient temperature, and which softens during a temperature increase, in particular after passing its glass transition temperature (Tg), and may exhibit a sharp transition upon passing what is referred to as its melting point (Tm), and which becomes solid again when the temperature decreases below its crystallization temperature.

The Tg, the Tc and the Tm are determined by differential scanning calorimetry (DSC) according to standards 11357-2:2013 and 11357-3:2013, respectively.

The number-average molecular weight Mn of said semi-crystalline polyamide thermoplastic polymer is preferably in a range extending from 10,000 to 85,000, especially from 10,000 to 60,000, preferentially from 10,000 to 50,000, even more preferentially from 12,000 to 50,000. These Mn values may correspond to inherent viscosities greater than or equal to 0.8, as determined in m-cresol according to standard ISO 307:2007 but by changing the solvent (use of m-cresol instead of sulfuric acid and the temperature being 20° C.).

The nomenclature used to define the polyamides is described in ISO standard 1874-1:2011 "Plastiques—Matériaux polyamides (PA) pour moulage et extrusion—Partie 1: Désignation", especially on page 3 (Tables 1 and 2) and is well known to the person skilled in the art.

The polyamide may be a homopolyamide or a co-polyamide or a mixture thereof.

In one embodiment, said thermoplastic polymer is a long-chain aliphatic polyamide, i.e. a polyamide having an average number of carbon atoms per nitrogen atom of greater than or equal to 8.5, preferably greater than 9, in particular greater than 10.

In particular, the long-chain aliphatic polyamide is selected from:
  polyamide 11 (PA11), polyamide 12 (PA12), polyamide 1010 (PA1010), polyamide 1012 (PA1012), polyamide 1212 (PA1012), or a mixture thereof or a copolyamide thereof, in particular PA11 and PA12.

More particularly, polyamide 11 (PA11), polyamide 12 (PA12), polyamide 1012 (PA1012), polyamide 1212 (PA1012), or a mixture thereof or a copolyamide thereof, in particular PA11 and PA12.

In one embodiment, the long-chain aliphatic polyamide is selected from:
  polyamide 12 (PA12), polyamide 1010 (PA1010), polyamide 1012 (PA1012), polyamide 1212 (PA1012), or a mixture thereof or a copolyamide thereof, in particular PA12.

In another embodiment, the long-chain aliphatic polyamide is selected from:
  polyamide 12 (PA12), polyamide 1012 (PA1012), polyamide 1212 (PA1212), or a mixture thereof or a copolyamide thereof, in particular PA12.

Advantageously, said semi-crystalline thermoplastic polymer is a long-chain semi-aromatic semi-crystalline polyamide, i.e. a polyamide having an average number of carbon atoms per nitrogen atom greater than 8.5, preferably greater than 9, in particular greater than 10 and a melting point from 240° C. to less than 280° C.

In particular, the long-chain semi-aromatic semi-crystalline polyamide is chosen from polyamide 11/T or 11/6T or the 11/10T, the MXDT/10T. The <PMDT/10T and the BACT/10T.

Advantageously, each sealing layer consists of a composition comprising the same type of polyamide.

In the event that welding is necessary, there are various methods making it possible to weld elements made of polyamide thermoplastic polymer. Thus, contact or contact-less heating blades, ultrasound, infrared, vibrations, rotation of one element to be welded against the other or even laser welding may be used.

Regarding the Impact Modifier

The impact modifier may be any impact modifier as long as it is a polymer having a modulus below that of the resin, having good adhesion to the matrix, so as to dissipate cracking energy.

The impact modifier advantageously consists of a polymer having a flexural modulus below 100 MPa measured according to standard ISO 178 and a Tg below 0° C. (measured according to standard 11357-2 at the inflection point of the DSC thermogram), in particular a polyolefin.

In one embodiment, PEBAs are excluded from the definition of impact modifiers.

The polyolefin of the impact modifier may be functionalized or non-functionalized or be a mixture of at least one functionalized polyolefin and/or least one non-functionalized polyolefin. To simplify, the polyolefin is denoted (B) and functionalized polyolefins (B1) and non-functionalized polyolefins (B2) are described below.

A non-functionalized polyolefin (B2) is classically a homopolymer or copolymer of alpha-olefins or diolefins, such as for example, ethylene, propylene, 1-butene, 1-octene, butadiene. By way of example, mention may be made of:
  the homopolymers and copolymers of polyethylene, particularly LDPE, HDPE, LLDPE (linear low-density polyethylene), VLDPE (very low density polyethylene) and metallocene polyethylene.
  homopolymers or copolymers of propylene.
    ethylene/alpha-olefin copolymers such as ethylene/propylene, EPR (abbreviation for ethylene-propylene-rubber) and ethylene/propylene/diene
    styrene/ethylene-butene/styrene (SEBS), styrene/butadiene/styrene (SBS), styrene/isoprene/styrene (SIS), styrene/ethylene-propylene/styrene (SEPS) block copolymers.
    copolymers of ethylene with at least one product chosen from the salts or esters of unsaturated carboxylic acids such as alkyl (meth)acrylate (for example methyl acrylate), or the vinyl esters of saturated carboxylic acids such as vinyl acetate (EVA), where the proportion of comonomer can reach 40% by weight.

The functionalized polyolefin (B1) may be a polymer of alpha-olefins having reactive units (functionalities); such reactive units are acid, anhydride, or epoxy functions. By way of example, mention may be made of the preceding polyolefins (B2) grafted or co- or ter-polymerized by unsaturated epoxides such as glycidyl (meth)acrylate, or by carboxylic acids or the corresponding salts or esters such as (meth)acrylic acid (which can be completely or partially neutralized by metals such as Zn, etc.) or even by carboxylic acid anhydrides such as maleic anhydride. A functionalized polyolefin is for example a PE/EPR mixture, the ratio by weight whereof can vary widely, for example between 40/60 and 90/10, said mixture being co-grafted with an anhydride, especially maleic anhydride, according to a graft rate for example of 0.01 to 5% by weight.

The functionalized polyolefin (B1) may be chosen from the following, maleic anhydride or glycidyl methacrylate grafted, (co)polymers wherein the graft rate is for example from 0.01 to 5% by weight:
  of PE, of PP, of copolymers of ethylene with propylene, butene, hexene, or octene containing for example from 35 to 80% by weight of ethylene;
  ethylene/alpha-olefin copolymers such as ethylene/propylene, EPR (abbreviation for ethylene-propylene-rubber) and ethylene/propylene/diene styrene/ethylene-butene/styrene (SEBS), styrene/butadiene/styrene (SBS), styrene/isoprene/styrene (SIS), styrene/ethylene-propylene/styrene (SEPS) block copolymers.

ethylene and vinyl acetate copolymers (EVA), containing up to 40% by weight of vinyl acetate;

ethylene and alkyl (meth)acrylate copolymers, containing up to 40% by weight of alkyl (meth)acrylate;

ethylene and vinyl acetate (EVA) and alkyl (meth)acrylate copolymers, containing up to 40% by weight of comonomers.

The functionalized polyolefin (B1) may also be selected from ethylene/propylene copolymers with predominantly maleic anhydride grafted propylene condensed with a monoamine polyamide (or a polyamide oligomer) (products described in EP-A-0,342,066).

The functionalized polyolefin (B1) may also be a co- or terpolymer of at least the following units: (1) ethylene, (2) alkyl (meth)acrylate or vinyl ester of saturated carboxylic acid and (3) anhydride such as maleic anhydride or (meth) acrylic acid or epoxy such as glycidyl (meth)acrylate.

By way of example of functionalized polyolefins of the latter type, mention may be made of the following copolymers, where ethylene represents preferably at least 60% by weight and where the termonomer (the function) represents for example from 0.1 to 10% by weight of the copolymer:

ethylene/alkyl (meth)acrylate/(meth)acrylic acid or maleic anhydride or glycidyl methacrylate copolymers;

ethylene/vinyl acetate/maleic anhydride or glycidyl methacrylate copolymers;

ethylene/vinyl acetate or alkyl (meth)acrylate/(meth) acrylic acid or maleic anhydride or glycidyl methacrylate copolymers.

In the preceding copolymers, (meth)acrylic acid can be salified with Zn or Li.

The term "alkyl (meth)acrylate" in (B1) or (B2) denotes C1 to C8 alkyl methacrylates and acrylates, and may be chosen from methyl acrylate, ethyl acrylate, n-butyl acrylate, isobutyl acrylate, 2-ethyl-hexyl acrylate, cyclohexyl acrylate, methyl methacrylate and ethyl methacrylate.

Moreover, the previously cited polyolefins (B1) may also be crosslinked by any appropriate method or agent (diepoxy, diacid, peroxide, etc.); the term functionalized polyolefin also comprises mixtures of the previously cited polyolefins with a difunctional reagent such as a diacid, dianhydride, diepoxy, etc. that can react with these or mixtures of at least two functionalized polyolefins that can react together.

The copolymers mentioned above, (B1) and (B2), may be copolymerized in a statistical or sequenced way and have a linear or branched structure.

The molecular weight, the index MFI, the density of these polyolefins may also vary widely, which the person skilled in the art will know. MFI, abbreviation for Melt Flow Index, is a measure of fluidity in the molten state. It is measured according to standard ASTM 1238.

Advantageously the non-functionalized polyolefins (B2) are selected from homopolymers or copolymers of polypropylene and any ethylene homopolymer or ethylene copolymer and a higher alpha-olefin comonomer such as butene, hexene, octene or 4-methyl-1-pentene. Mention may be made for example of PPs, high-density PEs, medium-density PEs, linear low-density PEs, low-density PEs, very low-density PEs. These polyethylenes are known by the person skilled in the art as being produced according to a "free-radical" method, according to a "Ziegler" catalysis method, or, more recently, a "metallocene" catalysis.

Advantageously the functionalized polyolefins (B1) are chosen from any polymer comprising alpha-olefin units and units carrying polar reactive functions like epoxy, carboxylic acid or carboxylic acid anhydride functions. By way of examples of such polymers, mention may be made of terpolymers of ethylene, of alkyl acrylate and of maleic anhydride or of glycidyl methacrylate like Lotader® from the Applicant or polyolefins grafted by maleic anhydride like Orevac® from the Applicant and terpolymers of ethylene, alkyl acrylate and (meth)acrylic acid. Mention may also be made of homopolymers or copolymers of polypropylene grafted by a carboxylic acid anhydride then condensed with polyamides or monoamine polyamide oligomers.

Advantageously, said composition constituting said sealing layer(s) is devoid of polyether block amide (PEBA). In this embodiment, PEBAs are therefore excluded from impact modifiers.

Advantageously, said transparent composition is devoid of core-shell particles or core-shell polymers.

Core-shell particle must be understood as a particle whose first layer forms the core and the second or all following layers form the respective shells.

The core-shell particle may be obtained by a method with several steps comprising at least two steps. Such a method is described for example in documents US2009/0149600 or EP0,722,961.

Regarding the Plasticizer:

The plasticizer may be a plasticizer commonly used in compositions based on polyamide(s).

Advantageously, use is made of a plasticizer which has good thermal stability so that it does not form fumes during the steps of mixing the different polymers and transforming the composition obtained.

In particular, this plasticizer may be selected from:

benzenesulfonamide derivatives, such as n-butyl benzenesulfonamide (BBSA), the ortho and para isomers of ethyl toluenesulfonamide (ETSA), N-cyclohexyl toluenesulfonamide and N-(2-hydroxypropyl)benzenesulfonamide (HP-BSA), esters of hydroxybenzoic acids, such as 2-ethylhexyl para-hydroxybenzoate (EHPB) and 2-decylhexyl para-hydroxybenzoate (HDPB), esters or ethers of tetrahydrofurfuryl alcohol, such as oligoethyleneoxytetrahydrofurfuryl alcohol, and esters of citric acid or hydroxymalonic acid, such as oligoethyleneoxymalonate.

A preferred plasticizer is n-butyl benzenesulfonamide (BBSA).

Another, more particularly preferred plasticizer is N-(2-hydroxypropyl)benzenesulfonamide (HP-BSA). Indeed, the latter has the advantage of preventing the formation of deposits at the extrusion screw and/or die ("die drool") during a step of transformation by extrusion.

Of course, it is possible to use a mixture of plasticizers.

Regarding the Composite Reinforcement Layer and the Polymer P2j

The polymer P2j can be a thermoplastic polymer or a thermoset polymer.

One or more composite reinforcement layers may be present.

Each of the said layers consists of a fibrous material in the form of continuous fibers impregnated with a composition predominantly comprising at least one thermoplastic polymer P2j, j corresponding to the number of layers present.

j is comprised from 1 to 10, in particular from 1 to 5, especially from 1 to 3, preferentially j=1.

The term "predominantly" means that said at least one polymer is present at more than 50% by weight relative to the total weight of the composition and of the matrix of the composite.

Advantageously, said at least one predominant polymer is present at more than 60% by weight, especially at more than 70% by weight, particularly at more than 80% by weight, more particularly greater than or equal to 90% by weight, relative to the total weight of the composition.

Said composition may further comprise impact modifiers and/or additives.

The additives may be selected from an antioxidant, a heat stabilizer, a UV absorber, a light stabilizer, a lubricant, an inorganic filler, a flame retardant, a plasticizer and a dye, with the exception of a nucleating agent.

Advantageously, said composition predominantly consists of said thermoplastic polymer P2j, from 0 to 15% by weight of impact modifier, in particular from 0 to 12% by weight of impact modifier, from 0 to 5% by weight of additives, the sum of the constituents of the composition being equal to 100% by weight.

Said at least one predominant polymer in each layer may be the same or different.

In one embodiment, a single predominant polymer is present at least in the composite reinforcement layer and does not adhere to the sealing layer.

In one embodiment, each reinforcement layer comprises the same type of polymer, in particular an epoxy resin or epoxy-based resin.

Polymer P2j

Thermoplastic Polymer P2j

Thermoplastic, or thermoplastic polymer, refers to a material that is generally solid at ambient temperature, which may be semi-crystalline or amorphous, in particular semi-crystalline, and that softens during a temperature increase, in particular after passing its glass transition temperature (Tg) and flows at a higher temperature when it is amorphous, or that may exhibit a sharp transition upon passing its so-called melting point (Tm) when it is semi-crystalline, and which becomes solid again when the temperature decreases below its crystallization temperature Tc, (for a semi-crystalline) and below its glass transition temperature (for an amorphous).

The Tg, Tc, and Tm are determined by differential scanning calorimetry (DSC) according to standard 11357-2:2013 and 11357-3:2013, respectively.

The number-average molecular weight Mn of said thermoplastic polymer is preferably in a range extending from 10,000 to 40,000, preferably from 10,000 to 30,000. These Mn values may correspond to inherent viscosities greater than or equal to 0.8, as determined in m-cresol according to standard ISO 307:2007 but by changing the solvent (use of m-cresol instead of sulfuric acid and the temperature being 20° C.).

Examples of suitable semi-crystalline thermoplastic polymers in the present invention include:
 polyamides, in particular comprising an aromatic and/or cycloaliphatic structure, including copolymers, for example polyamide-polyether copolymers, polyesters, polyaryletherketones (PAEK),
 polyetheretherketones (PEEK),
 polyetherketoneketones (PEKK),
 polyetherketone etherketone ketones (PEKEKK),
 polyimides, in particular polyetherimides (PEI) or polyimide-imides,
 polylsulfones (PSU), in particular polyarylsulfones such as polyphenylsulfones (PPSU),
 polyethersulfones (PES).

Semi-crystalline polymers are more particularly preferred, and in particular polyamides and their semi-crystalline copolymers.

The nomenclature used to define the polyamides is described in ISO standard 1874-1:2011 "Plastiques—Matériaux polyamides (PA) pour moulage et extrusion—Partie 1: Désignation", especially on page 3 (Tables 1 and 2) and is well known to the person skilled in the art.

The polyamide may be a homopolyamide or a co-polyamide or a mixture thereof.

Advantageously, the semi-crystalline polyamides are semi-aromatic polyamide, especially a semi-aromatic polyamide of formula X/YAr, as described in EP1505099, particularly a semi-aromatic polyamide of formula A/XT wherein A is selected from a unit obtained from an amino acid, a unit obtained from a lactam and a unit corresponding to the formula (Ca diamine).(Cb diacid), with a representing the number of carbon atoms of the diamine and b representing the number of carbon atoms of the diacid, a and b each being between 4 and 36, advantageously between 9 and 18, the unit (Ca diamine) being selected from linear or branched aliphatic diamines, cycloaliphatic diamines and alkylaromatic diamines and the unit (Cb diacid) being selected from linear or branched aliphatic diacids, cycloaliphatic diacids and aromatic diacids;

X.T denotes a unit obtained from the polycondensation of a Cx diamine and terephthalic acid, with x representing the number of carbon atoms of the Cx diamine, x being between 5 and 36, advantageously between 9 and 18, especially a polyamide with formula A/5T, A/6T, A/9T, A/10T, or A/11T, A being as defined above, in particular a polyamide chosen from among a PA MPMDT/6T, a PA11/10T, a PA 5T/10T, a PA 11/BACT, a PA 11/6T/10T, a PA MXDT/10T, a PA MPMDT/10T, a PA BACT/10T, a PA BACT/6T, PA BACT/10T/6T, a PA 11/BACT/6T, PA 11/MPMDT/6T, PA 11/MPMDT/10T, PA 11/BACT/10T, a PA 11/MXDT/10T, an 11/5T/10T.

T corresponds to terephthalic acid, MXD corresponds to m-xylylene diamine, MPMD corresponds to methylpentamethylene diamine and BAC corresponds to bis(aminomethyl)cyclohexane. Said semi-aromatic polyamides defined above especially have a Tg of greater than or equal to 80° C.

Thermoset Polymer P2j

The thermoset polymers are selected from epoxy resins or epoxy-based resins, polyesters, vinyl esters and polyurethanes, or a mixture thereof, in particular epoxy resins or epoxy-based resins.

Advantageously, each composite reinforcement layer consists of a composition comprising the same type of polymer, in particular an epoxy resin or epoxy-based resin.

Said composition comprising said polymer P2j can be transparent to radiation suitable for welding.

In another embodiment, the composite reinforcement layer is wound around the sealing layer in the absence of any subsequent welding.

Regarding the Structure

Said multilayer structure therefore comprises a sealing layer and at least one composite reinforcement layer that is wound around the sealing layer and which may or may not adhere to one another.

Advantageously, said sealing layer and reinforcement layers do not adhere to one another and consist of compositions that respectively comprise different polymers.

Nevertheless, said different polymers may be of the same type.

Thus, if one of the two welded composite reinforcing and sealing layers is made of a composition comprising an aliphatic polyamide, then the other layer is made of a composition comprising a polyamide which is not aliphatic and which is for example a semi-aromatic polyamide so as to have a high-Tg polymer as the matrix of the composite reinforcement.

Said multilayer structure may comprise up to 10 sealing layers and up to 10 composite reinforcing layers of different natures.

Advantageously, said structure is devoid of a binder or adhesive layer, either between the sealing layers, or between the composite reinforcement layers, or even between the outermost sealing layer and the innermost composite reinforcement layer.

It is obvious that said multilayer structure is not necessarily symmetrical and that it may therefore comprise more sealing layers than composite layers or composite layers or vice versa, but there can be no alternation of layers and reinforcement layer.

Advantageously, said multilayer structure comprises one, two, three, four, five, six, seven, eight, nine or ten sealing layers and one, two, three, four, five, six, seven, eight, nine or ten composite reinforcing layers.

Advantageously, said multilayer structure comprises one, two, three, four or five sealing layers and one, two, three, four or five composite reinforcing layers.

Advantageously, said multilayer structure comprises one, two or three sealing layers and one, two, or three composite reinforcing layers.

Advantageously, they consist of compositions which respectively comprise different polymers.

Advantageously, they consist of compositions that respectively comprise polyamides corresponding to the polyamides P1i and an epoxy or epoxy-based resin P2j.

In one embodiment, said multilayer structure comprises one sealing layer and several reinforcement layers, said adjacent reinforcement layer adjacent being wound around said sealing layer and the other reinforcement layers being wound around the directly adjacent reinforcement layer.

In another embodiment, said multilayer structure comprises a single reinforcing layer and several sealing layers, said reinforcing layer being would around said adjacent sealing layer.

In one advantageous embodiment, said multilayer structure comprises a single sealing layer and a single composite reinforcement layer, said reinforcement layer being wound around said sealing layer.

All combinations of these two layers are therefore within the scope of the invention, with the proviso that at least said innermost composite reinforcement layer is wound around said outermost adjacent sealing layer, the other layers adhering to one another or not.

Advantageously, in said multilayer structure, each sealing layer consists of a composition comprising the same type of polymer P1 i, in particular a polyamide.

The expression "same type of polymer" means, for example, a polyamide which may be the same or a different polyamide depending on the layers.

Advantageously, said polymer P1i is a polyamide and said polymer P2j is an epoxy or epoxy-based resin.

Advantageously, the polyamide P1i is identical for all the sealing layers.

Advantageously, said polymer P1i is a long-chain aliphatic polyamide, in particular PA1010, PA 1012, PA 1212, PA11, PA12, especially PA 11 or PA12.

Advantageously, the polyamide P1i is a long-chain semi-aromatic polyamide, in particular PA 11/5T, PA 11/6T or PA 11/10T. Obviously in this case, the ratio of 11 must be chosen carefully so that the Tm of said polymers is lower than 280° C., preferably 265° C.

Advantageously, in said multilayer structure, each reinforcement layer consists of a composition comprising the same type of polymer P2j, in particular an epoxy resin or epoxy-based resin.

Advantageously, the polyamide P2j is identical for all the reinforcement layers.

Advantageously, in said multilayer structure, each sealing layer consists of a composition comprising the same type of polymer P1 i, in particular a polyamide, and each reinforcement layer consists of a composition comprising the same type of polymer P2j, particular an epoxy or epoxy-based resin.

Advantageously, said polymer P1i is a long-chain aliphatic polyamide, in particular PA1010, PA 1012, PA 1212, PA11, PA12, especially PA 11 or PA12, and said polymer P2j is a semi-aromatic polyamide, in particular chosen from among a PA MPMDT/6T, a PA11/10T, a PA 11/BACT, a PA 5T/10T, a PA 11/6T/10T, a PA MXDT/10T, a PA MPMDT/10T, a PA BACT/10T, a PA BACT/6T, PA BACT/10T/6T, a PA 11/BACT/6T, PA 11/MPMDT/6T, PA 11/MPMDT/10T, PA 11/BACT/10T, a PA and 11/MXDT/10T.

In one embodiment, said multilayer structure consists of a single reinforcement layer and a single sealing layer in which said polymer P1i is a long-chain aliphatic polyamide, in particular PA1010, PA 1012, PA 1212, PA11, PA12, especially PA 11 or PA12, and said polymer P2j is a semi-aromatic polyamide, in particular chosen from a PA MPMDT/6T, a PA PA11/10T, a PA 11/BACT, a PA 11/6T/10T a PA MXDT/10T, a PA MPMDT/10T, a PA BACT/10T, a PA BACT/6T, a PA BACT/10T/6T, a PA 11/BACT/6T, PA 11/MPMDT/6T, PA 11/MPMDT/10T, PA 11/BACT/10T, a PA 11/MXDT/10T.

In another embodiment, said multilayer structure consists of a single reinforcement layer and a single sealing layer in which said polymer P1i is a long-chain aliphatic polyamide, in particular PA1010, PA 1012, PA 1212, PA11, PA12, especially PA 11 or PA12, and said polymer P2j is a semi-aromatic polyamide, in particular chosen from a PA MPMDT/6T, a PA PA11/10T, a PA 11/BACT, a PA 11/6T/10T a PA MXDT/10T, a PA MPMDT/10T, a PA BACT/10T, a PA BACT/6T, a PA BACT/10T/6T, a PA 11/BACT/6T, PA 11/MPMDT/6T, PA 11/MPMDT/10T, PA 11/BACT/10T, a PA 11/MXDT/10T.

In yet another embodiment, the multilayer structure consists of a single reinforcement layer and a single sealing layer wherein said polymer P1i is a long-chain aliphatic polyamide, in particular PA1010, PA 1012, PA 1212, PA11, PA12, or semi-aromatic, in particular chosen from polyamide 11/5T or 11/6T or the 11/10T, the MXDT/10T, the MPMDT/10T and the BACT/10T, in particular PA11 or PA12 and said polymer P2j is an epoxy or epoxy-based resin.

In another embodiment, the multilayer structure consists of a single reinforcement layer and a single sealing layer wherein said polymer P1i is a long-chain aliphatic polyamide, in particular PA1010, PA 1012, PA 1212, PA12, or semi-aromatic, in particular chosen from polyamide 11/5T or 11/6T or the 11/10T, the MXDT/10T, the MPMDT/10T and the BACT/10T, in particular PA12 and said polymer P2j is an epoxy or epoxy-based resin.

Advantageously, said multilayer structure further comprises at least one outer layer consisting of a fibrous material made of continuous glass fibers, which is impregnated with a transparent amorphous polymer, said layer being the outermost layer of said multilayer structure.

Said outer layer is a second reinforcement layer, but transparent, which makes it possible to be able to place text on the structure.

Said outer layer does not in any way correspond to the layer situated above the outermost composite reinforcement layer of polyamide polymer of which the structure is devoid as mentioned above.

Regarding the Fibrous Material

Regarding the fibers making up said fibrous material, they are in particular mineral, organic or plant fibers.

Advantageously, said fibrous material may be sized or unsized.

Said fibrous material can therefore comprise up to 3.5% by weight of an organic material (of thermosetting or thermoplastic resin type), referred to as sizing.

The mineral fibers include carbon fibers, glass fibers, basalt or basalt-based fibers, silica fibers, or silicon carbide fibers, for example. The organic fibers include thermoplastic or thermosetting polymer-based fibers, such as semi-aromatic polyamide fibers, aramid fibers or polyolefin fibers, for example. Preferably, they are amorphous thermoplastic polymer-based and have a glass transition temperature Tg higher than the Tg of the polymer or thermoplastic polymer mixture constituting the pre-impregnation matrix when the latter is amorphous, or higher than the Tm of the polymer or thermoplastic polymer mixture constituting the pre-impregnation matrix when the latter is semi-crystalline. Advantageously, they are semi-crystalline thermoplastic polymer-based and have a melting temperature Tm higher than the Tg of the polymer or thermoplastic polymer mixture constituting the pre-impregnation matrix when the latter is amorphous, or higher than the Tm of the polymer or thermoplastic polymer mixture constituting the pre-impregnation matrix when the latter is semi-crystalline. Thus, there is no melting risk for the organic fibers constituting the fibrous material during the impregnation by the thermoplastic matrix of the final composite. The plant fibers include natural linen, hemp, lignin, bamboo, silk, in particular spider silk, sisal, and other cellulose fibers, in particular viscose. These plant fibers can be used pure, treated or coated with a coating layer, in order to facilitate the adherence and impregnation of the thermoplastic polymer matrix.

The fibrous material may also be a fabric, a braid or woven with fibers.

It may also correspond to fibers with support threads.

These component fibers may be used alone or in mixtures. Thus, organic fibers can be mixed with the mineral fibers to be pre-impregnated with thermoplastic polymer powder and to form the pre-impregnated fibrous material.

The organic fiber strands may have several grammages. They can further have several geometries. The component fibers of the fibrous material can further assume the form of a mixture of these reinforcing fibers with different geometries. The fibers are continuous fibers.

Preferably, the fibrous material is selected from glass fibers, carbon fibers, basalt fibers or basalt-based fibers, or a mixture thereof, in particular carbon fibers.

It is used in the form of one roving or several rovings.

According to another aspect, the present invention relates to a method for producing a multilayer structure as defined above, characterized in that it comprises a step of preparing the sealing layer by extrusion blow molding, rotational molding, injection molding and/or extrusion.

In one embodiment, said method for producing a multilayer structure comprises a step of filament winding of the reinforcement layer as defined above around the sealing layer as defined above.

All the characteristics detailed above also apply to the method.

BRIEF DESCRIPTION OF THE FIGURES

It is expressed in cc·mm/m$^2$·24 h·atm. It can be expressed in cc·25 μ/m$^2$·24 h·Pa.

The permeability must then be multiplied by 101325.

EXAMPLES

In all the examples, the tanks are obtained by rotational molding of the sealing layer (liner) at a temperature adapted to the nature of the thermoplastic resin used.

In the event that a composite reinforcement made of epoxy resin or epoxy-based resin, use is then made of a process of wet filament winding, which consists in winding fibers around the liner, which fibers have been previously pre-impregnated in a bath of liquid epoxy or a bath of epoxy-based liquid. The reservoir is then polymerized in an oven for 2 hours.

In all other cases, a fibrous material previously impregnated with the thermoplastic resin (tape) is used. This tape is deposited by filament winding using a robot with a 1500 W laser heater at a speed of 12 m/min and there is no polymerization step.

Example 1: Charpy Impact Notched at −40° C. According to ISO 179-1:2010

Two long-chain liners in PA11 and PA12 and two short-chain liners were prepared by rotational molding as above.

Figure 1:
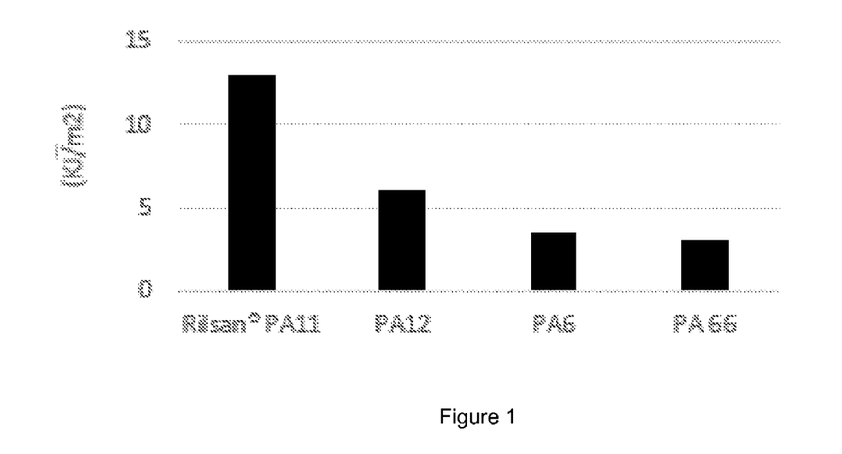
FIG. 1 shows the Charpy impact notched at −40° C. according to ISO 179-1:2010 of four liners: from left to right PA11, PA12, PA6 and PA66.

These four liners were Charpy impact tested notched at −40° C. and the results are shown in FIG. 1.

The cold resistance of long-chain liners is very clearly superior to that of short-chain PA6 and PA66 liners.

Example 2

Permeability of PA 11 and PA12 (Arkema) and HDPE (Marlex® HMN TR-942 (Chevron Phillips)) Liners Two long-chain liners: one in PA11 (Arkema) and the second in PA12 (Arkema) and an HDPE liner were prepared by rotational molding and the hydrogen permeability at 23° C. was tested.

This consists of sweeping the upper face of the film with the test gas (Hydrogen) and measuring the flow that diffuses through the film in the lower part by gas phase chromatography, swept by the carrier gas: Nitrogen The experimental conditions are presented in Table 1:

TABLE 1

| Device | LYSSY GPM500/GC coupling |
|---|---|
| Detection | Chromatographic (TCD) |
| Column | Poraplot Q (L = 27.5 m, Dint = 0.530 mm, Ep.film = 20 μ) |
| Vector gas | NITROGEN |
| Diffusing gas | HYDROGEN U (H2) |
| Test surface area | 50 cm² |
| Calibration | Absolute by direct injection through a septum |
| Pressure at column head | 18 psi |
| Oven temperature | Isothermal 30° C. |
| Detector temperature | 200° C. detector: TCD [-] |
| Injector temperature | Temperature of the lyssy injection loop |
| Temperature/ relative humidity | 23° C./0% RH |

Figure 2:
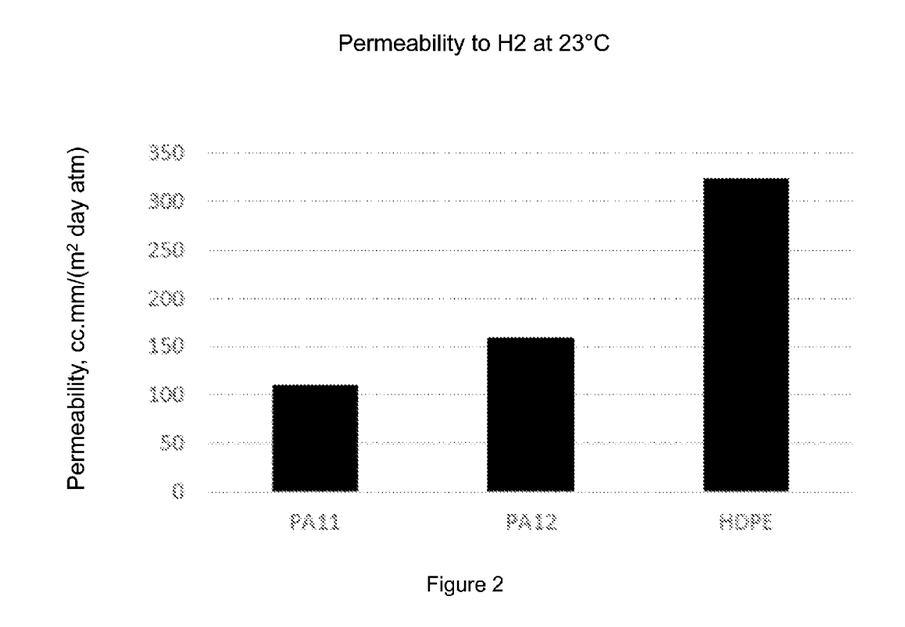
FIG. 2 shows the hydrogen permeability at 23° C. of liners PA12 and HDPE.

The results are presented in FIG. 2 and show that the PA11 liner and the PA12 liner both have a much lower permeability than a HDPE liner.

Example 3: Influence of the Proportion of Plasticizer (N-Butyl Benzene Sulfonamide: BBSA) on the Charpy Impact Notched at -40° C. According to ISO 179-1:2010

Two liners PA11 and PA12 without plasticizer or comprising 7 or 12% plasticizer (BBSA) relative to the total weight of the composition were prepared by rotational molding.

Figure 3:
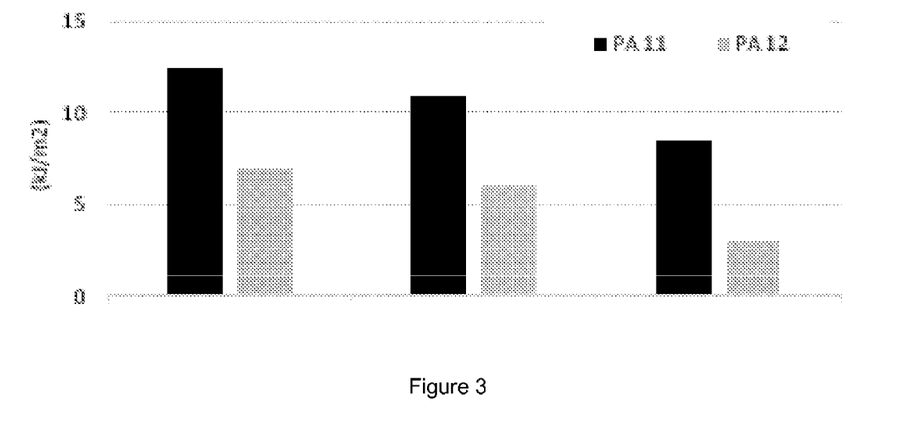
FIG. 3 shows the Charpy impact notched at −40° C. according to ISO 179-1:2010 of liners PA11 and PA12: for each group of histograms, PA11 is on the left and PA12 is on the right. The first group corresponds to 0% plasticizer, the second group to 7% plasticizer and the last group to 12% plasticizer.

These liners were Charpy impact tested notched at -40° C. according to ISO 179-1:2010 and the results are shown in FIG. 3.

The plasticizer has a detrimental effect when cold, it weakens the structure and increases the permeability, in particular by 50% with 7% of BBSA.

Example 4

Influence of the proportion of impact modifier ("LT cocktail" having the following composition: Iotader® 4700 (50%)+Iotader® AX8900 (25%)+Lucalene® 3110 (25%)) on the hydrogen permeability of the liner PA12.

The hydrogen permeability of the PA12 liner, without plasticizer and with or without impact modifier, was tested and is reported in Table 2.

TABLE 2

| Liner | Permeability (cc·25 μ/m²·24 h.atm) |
|---|---|
| PA12 alone | 7,300 |
| PA12 + 18% impact modifier | 15,000 |
| PA12 + 30% impact modifier | 22,000 |

The permeability can also be expressed in (cc·25 μ/m²·24 h·Pa).

The permeability must then be multiplied by 101325.

The results show that the proportion of impact modifier influences the hydrogen permeability.

The greater the proportion of impact modifier, the greater the permeability.

Example 5

Type IV hydrogen storage tank, composed of a T700SC31E (produced by Toray) carbon fiber epoxy composite reinforcement (Tg 120° C.) and a PA11 sealing layer.

The operating temperature is sufficient for a rapid filling of the tank, in particular in 3 to 5 minutes.

Example 6 (Counterexample)

Type IV hydrogen storage tank, composed of a T700SC31E (produced by Toray) carbon fiber epoxy composite reinforcement (Tg 120° C.) and an HDPE sealing layer.

The operating temperature is too low for a rapid filling of the tank, in particular in 3 to 5 minutes.

Example 7: Type IV Hydrogen Storage Tank, Composed of a T700SC31E (Produced by Toray) Carbon Fiber Epoxy Composite Reinforcement BACT/10T and a PA12 Sealing Layer The selected BACT/10T composition has a melting temperature, Tm, of 283° C., a crystallization temperature, Tc, of 250° C. and a glass transition temperature of 164° C.

The Tg, the Tc and the Tm are determined by differential scanning calorimetry (DSC) according to standards 11357-2:2013 and 11357-3:2013, respectively.

A BACT/10T PA-based composite has a high Tg matrix, but without having long crosslinking, of the 8 h type at 140° C.

Therefore, after fiber removal, the tank is finished, which saves 8 hours of process time.

The invention claimed is:

1. A multilayer structure intended for transporting, distributing, or storing hydrogen, comprising, from the inside to the outside, at least one sealing layer and at least one composite reinforcement layer,
    said innermost composite reinforcement layer being wound around said outermost adjacent sealing layer,
    said sealing layers consisting of a composition comprising:
    more than 50% by weight relative to the total weight of the composition of at least one long-chain polyamide thermoplastic polymer P1i, i=1 to n, n being the number of sealing layers, semi-crystalline including the Tm, as measured according to ISO 11357-3:2013, is greater than 160° C.,
    said long-chain polyamide thermoplastic polymer having an average number of carbon atoms per nitrogen atom greater than 9,
    excluding a polyether block amide (PEBA),
    up to 50% by weight of impact modifier relative to the total weight of the composition,
    up to 1.5% by weight of plasticizer relative to the total weight of the composition,
    said composition being devoid of nucleating agent,
    said at least one predominant polyamide thermoplastic polymer in each sealing layer that may be the same or different,
    and at least one of said composite reinforcement layers consisting of a fibrous material in the form of continuous fibers, which is impregnated with a composition comprising more than 50% by weight, relative to the total weight of the composition, of at least one polymer P2j, j=1 to m, m being the number of reinforcement layers, said structure being devoid of a polyamide polymer layer, said polyamide polymer layer being the outermost and adjacent to the outermost layer of composite reinforcement.

2. The multilayer structure according to claim 1, wherein each sealing layer comprises the same type of polyamide.

3. The multilayer structure according to claim 1, wherein each reinforcement layer comprises the same type of polymer.

4. The multilayer structure according to claim 3, wherein each sealing layer comprises the same type of polymer and each reinforcement layer comprises the same type of polymer.

5. The multilayer structure according to claim 1, wherein it has a single sealing layer and a single reinforcement layer.

6. The multilayer structure according to claim 1, wherein said polymer P1i is a long-chain aliphatic polyamide, or semi-aromatic.

7. The multilayer structure according to claim 1, wherein said polymer P2j is an epoxy resin or epoxy-based resin.

8. Multilayer structure according to claim 6, wherein said multilayer structure consists of a single reinforcement layer and a single sealing layer in which said polymer P1i is a long-chain aliphatic polyamide, or semi-aromatic, the MXDT/10T, the MPMDT/10T and the BACT/10T.

9. The multilayer structure according to claim 1, wherein the fibrous material of the composite reinforcement layer is selected from glass fibers, carbon fibers, basalt fibers or basalt-based fibers, or a mixture thereof.

10. The multilayer structure according to claim 1, wherein said structure further comprises at least one outer layer consisting of a fibrous material made of continuous glass fibers, which is impregnated with a transparent amorphous polymer, said layer being the outermost layer of said multilayer structure.

11. A method for producing a multilayer structure as defined in claim 1, wherein it comprises a step of preparing the sealing layer by extrusion blow molding, rotational molding, injection molding and/or extrusion.

12. The method for producing a multilayer structure as defined in claim 11, wherein it comprises a step of filament winding of the reinforcement layer around the sealing layer.

* * * * *